H. N. OTT AND F. H. BUFTON.
ADJUSTING MEANS FOR PROJECTION OBJECTIVES.
APPLICATION FILED NOV. 13, 1919.
1,341,667.
Patented June 1, 1920.
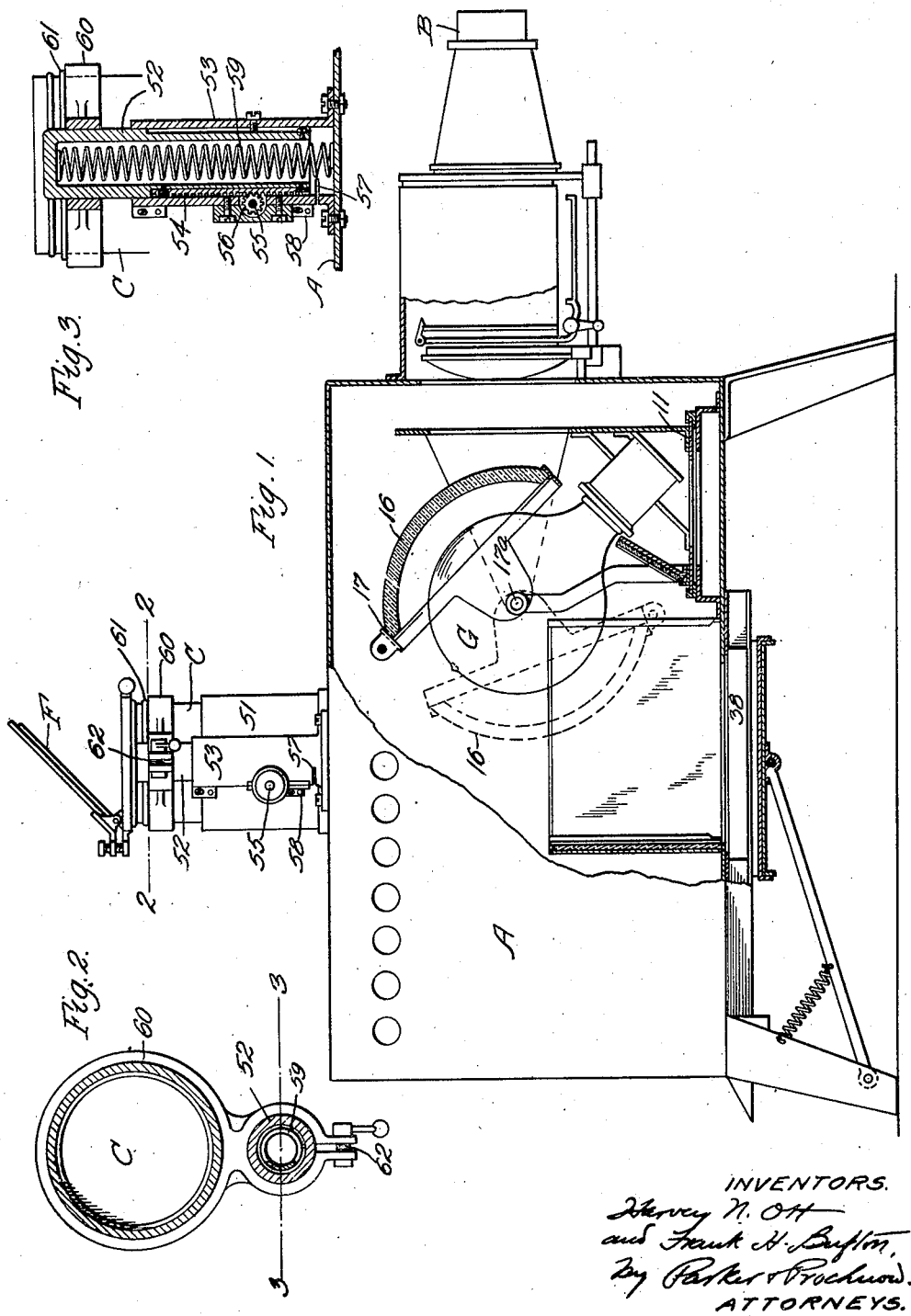
INVENTORS.
Harvey N. Ott
and Frank H. Bufton,
By Parker & Prochnow.
ATTORNEYS.

UNITED STATES PATENT OFFICE.

HARVEY N. OTT AND FRANK H. BUFTON, OF BUFFALO, NEW YORK, ASSIGNORS TO SPENCER LENS CO., OF BUFFALO, NEW YORK.

ADJUSTING MEANS FOR PROJECTION OBJECTIVES.

1,341,667.  Specification of Letters Patent.  Patented June 1, 1920.

Original application filed October 31, 1916, Serial No. 128,699. Divided and this application filed November 13, 1919. Serial No. 337,772.

*To all whom it may concern:*

Be it known that we, HARVEY N. OTT and FRANK H. BUFTON, citizens of the United States, residing at Buffalo, in the county of Erie and State of New York, have invented a new and useful Improvement in Adjusting Means for Projection Objectives, of which the following is a specification.

This invention relates to adjusting means for projection objectives and particularly for projection objectives such as are used in projection apparatus for projecting the images of opaque objects.

This application is a division of our application for Patent filed Oct. 31, 1916, Serial No. 128,699.

The objects of the invention are to provide adjusting means for opaque projection objectives or other objectives which works easily and enables the ready adjustment of the objective to the desired position; to provide adjusting means for such objectives which will insure the holding of the objective in the adjusted position, and to improve adjusting means of this sort in other respects hereinafter set forth.

In the accompanying drawings:

Figure 1 is a side elevation partly in section of a projection apparatus, having an opaque objective which is provided with adjusting means constructed in accordance with the invention.

Fig. 2 is a sectional plan view, enlarged, on line 2—2 Fig. 1 of the adjusting means for the objective for the opaque objects.

Fig. 3 is a sectional elevation thereof on line 3—3 Fig. 2.

An adjusting means for projection objectives constructed in accordance with one embodiment of the invention is shown in the drawings associated with a projection apparatus which will be briefly described.

A represents the casing or light chamber of the apparatus. B represents the objective for the transparent lantern slides or objects, and C represents the opaque projection objective. The objective B for the lantern slides is arranged at the front end of the casing and the other objective C at the top of the casing. F represents an inclined mirror or reflector for directing the light rays forwardly from the objective C to the screen. G is an incandescent lamp or other usual source of light, which may be supported on a slide or carriage 11 arranged to slide into and out of the casing.

16 represents a mirror for reflecting light from the lamp onto the opaque object or post card, which is supported face upward at the bottom of the casing in a holder or device 38. The mirror is secured in a pivoted ring 17 which is provided with journals $17^a$, so that the mirror may be swung from the position shown in full lines in Fig. 1 to the position shown in dotted lines. In this position the light from the lamp G is permitted to pass directly into the objective B.

The invention does not relate to the construction of these parts and they may be of any usual or suitable construction.

The projection objective C for the post cards or opaque objects is adjustable vertically for properly focusing it and for this purpose the objective is arranged to slide vertically in a guide tube 51 fixed on top of the casing A. The lens tube with the lenses of the objective and the mirror carried thereby are frequently large and heavy and if the usual rack and pinion arranged at one side of the lens tube are employed for adjusting the objective, the weight of the parts will cause them to lower and prevent them from being held stationary in the adjusted position unless the friction of the adjusting mechanism is so great as to be objectionable in use. On account of the large diameter of the lens tube, it is also liable to bind in its guide and make the adjusting mechanism work hard. In order to overcome these objections and provide means which can be readily and easily operated for adjusting the objective and which will insure the holding of the same in its adjusted position, the following construction is employed: 52 represents a vertical plunger or post arranged to slide vertically in a cylinder or tubular guide 53 fixed in any suitable manner on top of the casing A at one side of the objective. The post is provided at one side with a toothed rack 54, and an adjusting shaft 55 suitably journaled on the guide cylinder is provided with a pinion 56 meshing with the rack for raising and lowering the post. Any other suitable means for adjusting the post may be substituted. The adjusting shaft is provided at its outer end with a finger wheel or other means for turning it. The guide cylinder is preferably slotted transversely at its lower portion as indicated at 57 and is split longitudinally above this slot to permit it to be contracted on the post sufficiently to create the desired friction to oppose the movement of the post. The split portion of the guide tube, as shown, is provided with ears or lugs 58 connected by screws for contracting it on the post. The post is made hollow and a spring 59 inclosed therein between the top of the casing and the upper end of the post tends to lift the post and the parts connected therewith and to yieldingly resist the descent of the same. The post is connected to the lens tube of the objective C, or otherwise associated therewith in any suitable manner, so that the weight of the lens tube and the parts thereon is carried by the adjusting post, and the objective is adjusted by the adjustment of the post. As shown, a connecting ring 60 surrounds the lens tube below a lip or collar 61 thereon and is provided with a split clamping portion which embraces the upper end of the adjusting post and is clamped thereon as by means of a screw 62. This clamp can be readily secured to the post at the required elevation with reference to the lens tube. By this arrangement the spring 59 tends to lift the post and the objective connected thereto and to oppose the descent of these parts. By using a spring which substantially counterbalances the weight of the post and parts connected thereto, the adjusting gear can be turned easily and the parts will nevertheless be supported in the adjusted position without the likelihood of lowering from this position under the force of gravity. Since the adjusting post is of small diameter it is not apt to bind in its guide cylinder and it properly guides the objective. This arrangement also enables the adjusting shaft to be placed lower in a more convenient position than it could be placed on the objective guide tube.

We claim as our invention:

1. In a projection apparatus, the combination of a projection objective, a guide in which said objective is arranged to slide up and down, a guide arranged at one side of said objective, a post arranged to slide up and down in said last mentioned guide, a spring which acts to lift said post, means for moving said post up and down, and means whereby the post supports at least in part the weight of said objective.

2. In a projection apparatus, the combination of a projection objective, a guide tube in which said objective is arranged to slide up and down, a guide tube arranged at one side of said objective, a hollow post arranged to slide up and down in said guide tube, a spring located in said hollow post and acting to lift the same, means for adjusting said post up and down, and means connecting said post to said objective for causing the objective to move with the post.

3. In a projection apparatus, the combination of a projection objective, a guide tube in which said objective is arranged to slide up and down, a guide tube arranged at one side of said objective, a hollow post arranged to slide up and down in said second mentioned guide tube, a spring located in said hollow post and acting to lift the same, means for adjusting said post up and down, and a connecting device connected to said objective and adjustably secured to said adjusting post.

4. In a projection apparatus, the combination of a projection objective, a guide in which said objective is arranged to slide for focusing the objective, a second guide arranged parallel with said first guide at one side thereof, a post arranged to slide endwise in said second guide, a spring which tends to move said post in one direction, means for adjusting said post endwise, and means connecting said post to said objective for causing the objective to move with the post.

Witness our hands this 11th day of November 1919.

HARVEY N. OTT.
FRANK H. BUFTON.

Witnesses:
ISABEL FAIRBURN,
EDWARD E. TROST.